United States Patent [19]

Kritzinger

[11] Patent Number: 4,970,421
[45] Date of Patent: Nov. 13, 1990

[54] ELECTRIC MACHINES

[76] Inventor: Cornelius A. J. Kritzinger, 180 Odendaal Street, Meyerspark, Pretoria, Transvaal, South Africa, 0184

[21] Appl. No.: 269,264

[22] Filed: Nov. 9, 1988

[51] Int. Cl.⁵ .......................................... H02K 37/00
[52] U.S. Cl. ................................. 310/49 R; 310/217
[58] Field of Search ...................... 310/49 R, 216, 217, 310/254, 259

[56] References Cited
U.S. PATENT DOCUMENTS 4,638,195 1/1987 Lin .................................. 310/119 R
4,754,178 1/1988 Kavanaugh .......................... 310/217

Primary Examiner—Peter S. Wong
Assistant Examiner—Judson H. Jones

[57] ABSTRACT

Electric reluctance motors (or generators) using toothed rotor and stator peripheries but with simple spool windings switched by bi-directional power amplifiers useful both for continuous rotation (or linear translation) or stepwise operation. Angular definition (e.g. for robotics) to minutes of arc by automated assembly of standard lamination pressings seem feasible.

4 Claims, 4 Drawing Sheets

ELECTRIC MACHINES

BACKGROUND

1. Field of Invention

This invention relates to electric machines, both motors and generators. The invention is applicable to machines running at constant speeds or at continuously variable speeds and elevation and traverse actuators for full circle and circle segments. The invention is also applicable to linear motions analogous to the above. Such motors are used, for example, in magnetic disc memories, in robotics, numerically controlled machines, turrets and in many other applications. The invention can also be applied to provide a machine having an operation analogous to a solenoid.

2. Related Art

Stepping motors using a magnetic reluctance principle have been described, for example, in the German Offenlegungschrifts Nos. 3124352, 3123540 and 3121547. These patents describe constructions and configurations of the stator and rotor which seek to attain certain construction advantages.

British Pat. No. 2157089 describes a single phase reluctance motor which uses solid mild steel stator poles and rotor poles.

It is an object of the present invention to provide a machine of this kind with a plurality of discrete magnetic circuits preferably each made up of a plurality of thin laminations or magnetically oriented domains of a composite material and to provide these in a multiple phase arrangement.

A related object to the aforegoing is to provide a design in which the laminations are assembled lying in planes which are parallel with (rather than orthogonal as in conventional electric machines) the axis of rotation of a rotational machine.

It is a further object to provide a multiple phase machine which is simple to make, in which the magnetic circuits are fitted or moulded around simple spool windings and robot manufacturing techniques may be facilitated.

Another object is to provide modular components from which different machines having widely different operating speeds or numbers of actuator positions can be assembled with differing numbers of the modular components. This allows the speed of the machines to be adapted over a wide range to the speed of the load or power source without the use of a gearbox.

Finally it is an object to provide a machine which can be made to function, at will, as either a motor or a generator and to provide regenerative braking if required.

SUMMARY OF THE INVENTION

An electric reluctance machine in accordance with this invention has a multiple phase arrangement, a spool winding to provide an electrical excitation in each phase, in each phase the circuit including a thin rotor or moving part having toothed formations and electric current switching means to provide synchronised control of current in each winding, in which the machine stator comprises a plurality of discrete closed magnetic circuits for each phase, each magnetic circuit presenting toothed formations of corresponding pitch to the moving parts.

The expression "thin moving part" refers to the dimension in the general direction of magnetic flux in use in the moving part. The term "thin" is defined in the context of this specification to mean a dimension much less than other dimensions of the moving part. For example the "thin" dimension is preferably less than one tenth of the radius of gyration of the part.

In accordance with a preferred embodiment of the invention the machine is further characterised by the magnetic circuits being made up of assembled laminations which lie in planes parallel to the axis of rotation of a rotational machine, or by magnetically oriented domains of a composite material. In both cases a high grade magnetiseable material giving maximum magnetic flux density, e.g. of 1,4 Tesla, is preferred.

A feature of this invention is to make use of switching technology which has only become available after the classical machine designs were established. Modern switching technology makes it feasible to efficiently control the magneto-motive-force (by control of current) in the magnetic circuit, rather than the voltage as in the classical machines. As a result it becomes possible to control the direction of energy transfer which determines whether the machine acts as a motor or a generator. To this end a bi-directional switching power amplifier as invented by Cuk and Middelbrook could be employed.

In the class of rotary/linear electromagnetic reluctance machines to which this invention belongs, torque/translatory force is produced by the magnetic interaction between a moving magnetic member and a stationary magnetic member. Drastic reduction of the mass of the moving member is possible without any sacrifice in torque/force if it is observed that only components of the lines of force in the direction of movement can contribute to the torque/force. As a result (which appears from a simplified approximate calculation based on classical field theory it appears that practically the full torque or force possible can be generated by using a moving member that is no more than ten air gap lengths in dimension at right angles to the direction of motion and in the general direction of flux lines. This is far more than an order of magnitude improvement over the classical design.

It is also clear that the torque/force also changes very rapidly with angle/displacement, in fact for tooth widths (i.e. the tooth dimension in the direction of motion) much larger than the air gap a translation of about five air gap lengths will give as much torque/force as can be obtained. This implies that for tooth widths down to about five airgap lengths, the torque that is obtainable will be directly proportional to the number of teeth. It therefore becomes possible to choose the number of teeth to suit the application. For a given size of machine the power will therefore be independent of the speed e.g. a 1 kilowatt machine could be made with say 4 teeth or 400 teeth. For the same switching frequency the speed of the 4 tooth machine will be 100 times more than for the other but the torque will be 100 times less. The product speed × torque remains sensibly the same. The number of teeth will depend on the speed range required.

It would also appear that shaping of the teeth could provide a more linear relationship between force/torque and displacement.

Continuous torque is assured by providing at least two phases in the machine. This invention is preferably characterised in this regard by at least two, e.g. three magnetic circuits, one to each phase.

Preferably the machine is constructed having a large number of teeth, by which is meant a number, for example greater than 50 teeth in a rotary machine, say up to 1000 teeth or more. The number of teeth will be set in the case of a stepper motor to determine the degree of resolution of the motor. For example in the case of a gun turret a thousand teeth machine will provide a high degree of rotational resolution without problems of friction and stiction to which mechanical means are subject and in a motor a high torque but a low speed.

The spool winding(s) of the machine may, for example, be provided conveniently with aluminum foil windings having anodised aluminium insulation. The frequency of switching the electric current which provides the magnetic excitation in such a machine will be selected accordingly to provide the required rotational speeds in the light of the number of teeth. In this manner very large rotational torques in a rotational machine (or motor force in a linear machine) can be arranged even at very low speeds. For this purpose a solid state switching amplifier, (preferably a bi-directional switching amplifier as has been described by Cuk and Middelbrook) which will permit induction braking can be employed. The bi-directional amplifiers can be controlled in their frequency and timing by measurement of the displacement of the rotor with respect to the stator. The current magnitude can be controlled in a given machine configuration with regard to the required torque during operation.

Included in the scope of this invention is the electric machine which will function in a manner analogous to known solenoids. This will thus be a linear machine of limited travel.

Preferably further a thin cup rotor is used, that is a rotor which is of cup shape or of double cup shape back to back, the rim of the cup being provided with the teeth referred to in correspondence with teeth of the stator. The walls of the cup are thin to provide lightness and low inertia which will manifest itself in a low radius of gyration in the case of a rotary machine, permitting high acceleration. Such a thin cup rotor will present its thin dimension in the direction to be traversed by the lines of magnetic force of the machine during operation. The cup may be made in a non magnetic material with embedded islands of preferably laminated magnetic material which constitute the teeth, i.e. the teeth may not be physically visible but exist by virtue of discontinuities in magnetic permeability of the material.

Apart from two phase the number of phases is entirely optional and, for example a larger number of phases may be arranged in accordance with the requirements of a particular design. One phase or an auxiliary coil per phase for example may be applied to detect positional information (rather than no provide drive) which can be used to control switching to the power phases.

Magnetic material is preferably laminated or elongated single domain composites may be used to avoid eddy current effects in the stator and rotor components.

BRIEF DESCRIPTION OF THE DRAWINGS

The invention will be more fully described by way of example with reference to the accompanying drawings, in which.

DESCRIPTION OF THE PREFERRED EMBODIMENTS

Figure 1:
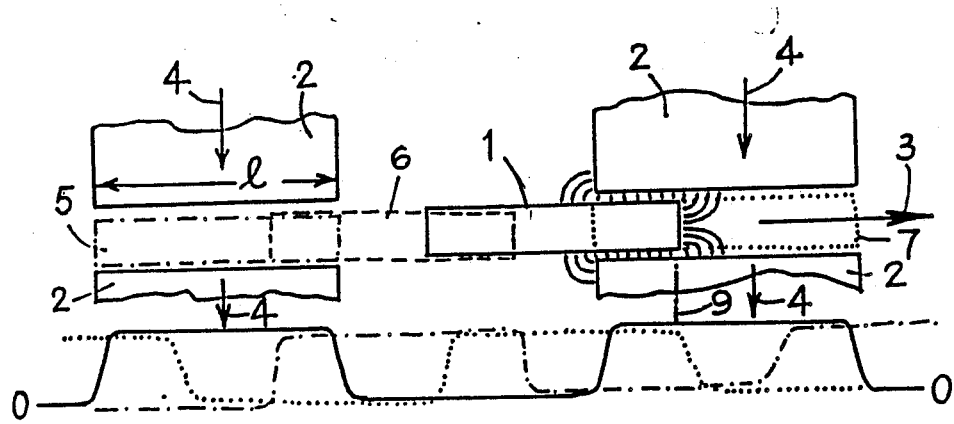
FIG. 1 is a schematic representation of an electric machine in accordance with the invention.

As shown in FIG. 1 the electric machine comprises a toothed moving part 1 and stationary tooth parts 2, the moving part 1 moving in the direction indicated by the arrow 3. The closed magnetic circuit of the machine is not shown in this schematic representation but would be closed in such a manner that the general direction of magnetic flux would be as indicated by the arrows 4. The magnetic lines of force between the moving part 1 and the stationary parts 2 are indicated. These cause a net force on the moving part 1 attracting it into a position in which it would be in full alignment with the stationary parts 2 on the right hand side of FIG. 1. This would be the final position of the moving part 1 in moving from the left hand pair of stationary parts 2 to the right hand pair. This cycle of movement which requires description would commence at the left hand pair of stationary parts 2 in the position indicated by the dashed and dotted lines 5, one third of the required movement to the final position would be reached in the position indicated by the dashed lines 6, two thirds of that movement would be indicated by the full lines as shown by the illustrated position of the moving part 1 and the final position would be as shown by the dotted line 7. In order to obtain continuing movement of the moving part 1 from one pair of fixed parts to the next and onwards the magnetic excitation applied to the magnetic circuits will be as indicated in the curve shown below the structure illustrated in FIG. 1. The position on this curve corresponds with the position indicated by the dashed and dotted line 9 at the leading edge of the moving part 1. Thus the magnetic excitation would drop to zero as indicated by the base line 0—0 as the leading edge of the moving tooth 1 commences to leave the first pair of stationary teeth 2 as it commences to move from the position indicated by the dashed and dotted lines 5. It would remain at zero until the leading edge of the moving tooth 1 just begins to enter the next pair of stationary teeth and would be maintained until the moving tooth is fully in alignment with the stationary teeth 2 whereafter it would again drop to zero. Two further sets of such components would be provided with the moving parts staggered, the first set in a position corresponding with that indicated by the dashed and dotted lines 5, the second set by the position indicated by the dashed line 6 and the third set by the solid line 1. The magnetic excitation may be supplied by means of suitable windings being given a suitable pulsed d.c. supply as indicated in FIG. 1. For this purpose suitable solid state switching circuitry would be provided. Such a three phase pulsed supply is indicated schematically by the additional square waves illustrated in dashed and dotted lines and in dotted lines respectively. The proportions of the width of the tooth as shown in FIG. 1 to the air gap as shown in FIG. 1 has been chosen in this figure for purposes of convenience.

of illustration but may be chosen to suit the speed needs of a particular application. Since the air gap will generally be made as small as possible so as to provide effective magnetic circuits of minimum reluctance this will allow making the teeth relatively narrow and therefore of large number which in turn will allow the provision of a very high torque when required for a low speed machine. The upper limit to the number of teeth will be reached when the tooth widths are of the order of 5 times the air gap length.

Figure 2:
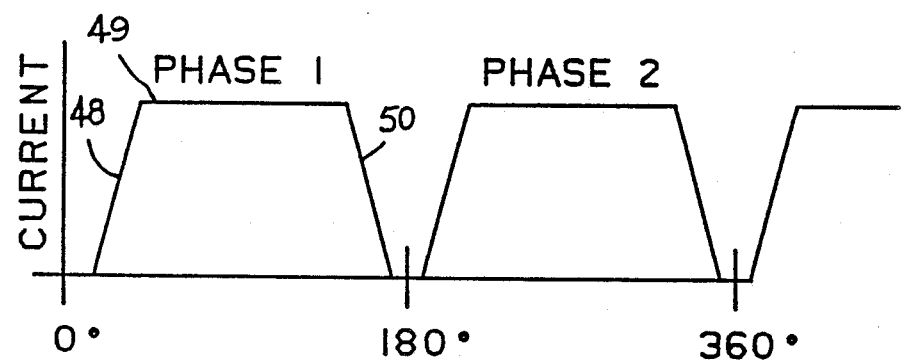
FIG. 2 is a graph of excitation current in a four phase motor.

FIG. 2 shows theoretically desirable current profiles for a two phase machine over one complete rotation of the rotor. Only two phases are drawn, further phases being analogous could be used.

Figure 3:
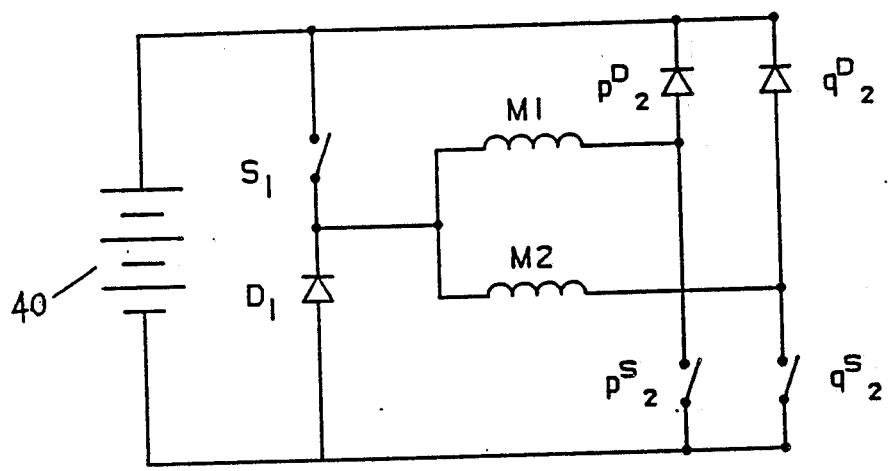
FIG. 3 is a schematic circuit diagram of a driving circuit for the machine shown in FIGS. 4–7.
Figure 4:
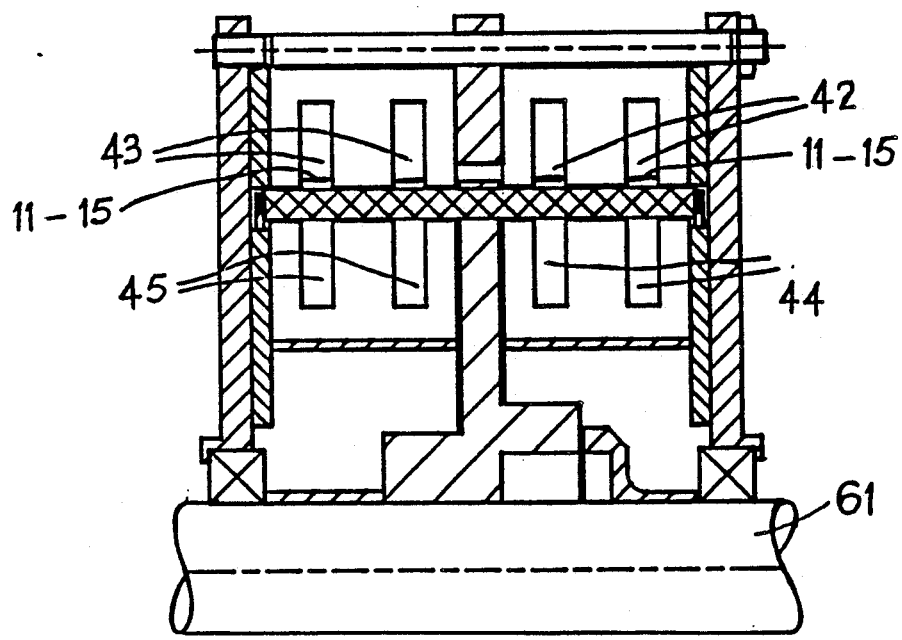
FIG. 4 is an axial cross sectional view showing a four phase motor.

FIG. 3 shows in principle the electric circuitry to achieve this current supply. An original basic current source at approximately 300 volts is indicated in principle by the battery 40 which is fed to the motor. In FIG. 3 the two phases are drawn, the switching circuitry for these phases is also shown. FIGS. 4 to 7 show a motor in accordance with the preferred embodiment of the invention to which the graph shown in FIG. 2 and the circuit diagram shown in FIG. 3 apply. In FIG. 4 each of the two paired phase windings are shown being phase 1 at 42, and 44 and phase 2 at 43 and 45, each of these windings being a single continuous spool winding.

Figure 5:
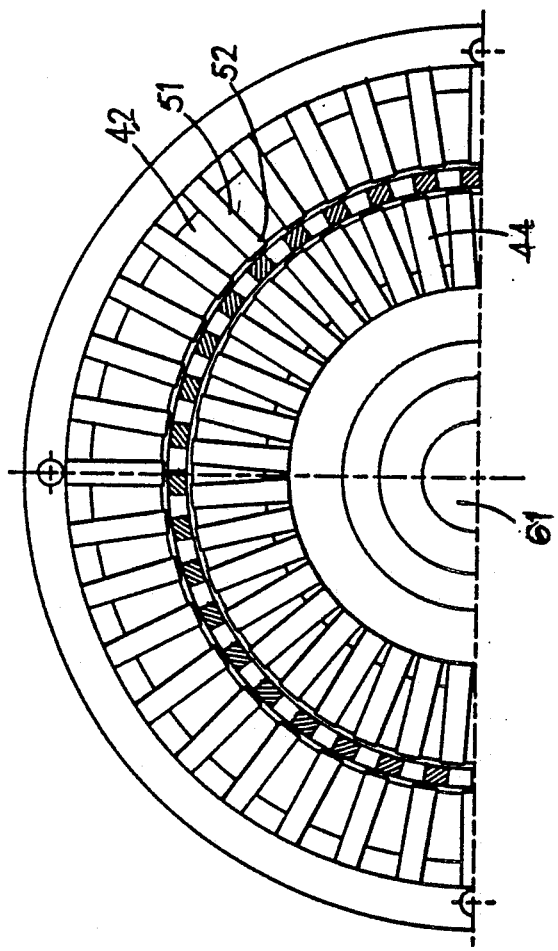
FIG. 5 is a partial end - on sectional view of the motor shown in FIG. 4.

The current source 41 shown in FIG. 3 thus supplies current to each of the phases in accordance with control exercised by the FET's $S_1$ working $_pS_2$ for phase 1, and $_pS_2$ for phase 2. The electrical paramaters are designed so that when each FET switches on the current rise as indicated by the portion 48 in FIG. 2 in the case of phase 1 is as fast as possible until the plateau 49 is reached which is then maintained by the constant current source until the FET is switched off with the current fall as indicated by the portion 50 being again as fast as possible. The value of the current plateau 49 is selected to provide the correct degree of magnetisation of the magnetic circuits. For example, using conventional materials 1,4 Tesla could be a design figure. In this context, in order to make allowance for leakage flux which would otherwise increase the average flux density in the magnetic circuits into the saturation level, in the view of FIG. 5 the magnetic circuits may be thickened at the area 51 as compared with the width of the circuit at the teeth 52. We may pause at this stage to note that in FIG. 5 the teeth are made up of laminations (not shown) to minimise eddy current losses, FIG. 4 showing how each lamination is of E-cross section shape. FIGS. 4 and 5 also show the unusual and valuable feature of the machine in accordance with this invention, namely that in the manufacturing process the spool windings, for example 42, are not wound on to the magnetic core as in conventional practice but instead are first wound in a former and thereafter the magnetic materials in the form of the multiplicity of teeth laminations are added to the winding. This greatly simplifies the manufacturing process and lends it to automated assembly by industrial robots.

It will be appreciated that a high technology approach can make possible higher magnetic flux loadings than the figure mentioned above.

Referring to FIG. 3 at the stage of switch off of each FET the inductive energy is discharged via a diode $_pD_2$ in the case of phase 1, a diode $_qD_2$ in the case of phase 2 and so on. The discharged energy is returned to the source where the energy is usefully returned to the system. The control of the switching of the FET's for the phases can be derived from signals delivered by the auxiliary coils for each phase. The auxiliary coils are best located as near to the rotor as possible thus improving the signal which will supply the necessary threshold values to switch the FET's.

These auxiliary coils thus provide the necessary measurement of shaft position for control of the switching and optical commutation is not needed. However, in principle other techniques of commutation can be resorted to.

FIG. 3—Basic Drive Circuit.

$S_1$ and either $_pS_2$ or $_qS_2$ close simultaneously.

Motoring $s_1$ opens when current reaches set upper limit. $D_1$ (freewheel diode) maintains current through drive coil when $S_1$ is off. $S_1$ closes when current falls below lower limit. Current builds up to upper limit and again interrupts $S_1$. Upper and lower limits are continuously adjustable giving full control of average current through coils. Commutation signals select $_pS_2$ or $_qS_2$ according to position of rotor thereby giving torque on required direction. Magnetic field energy is supplied on first closure of $S_1$ and is returned to battery on opening of $_pS_2$ or $_qS_2$ at end of each phase's cycle.

Regeneration or Braking Operation

Commutation signals reverse phase to $_pS_2$ and $_qS_2$. Initial closure of $S_1$ and $_pS_2$ or $_qS_2$ creates magnetic field which provides counter torque. Current increases up to required upper limit $S_1$ opens $D_1$ takes over. Current builds up M coil due to E.M.F. M coils $_pS_2$ or $_qS_2$ opens when current exceeds another set limit and energy is fed back via flyback diode $_pD_2$ or $_qD_2$ to the battery.

Figure 7:
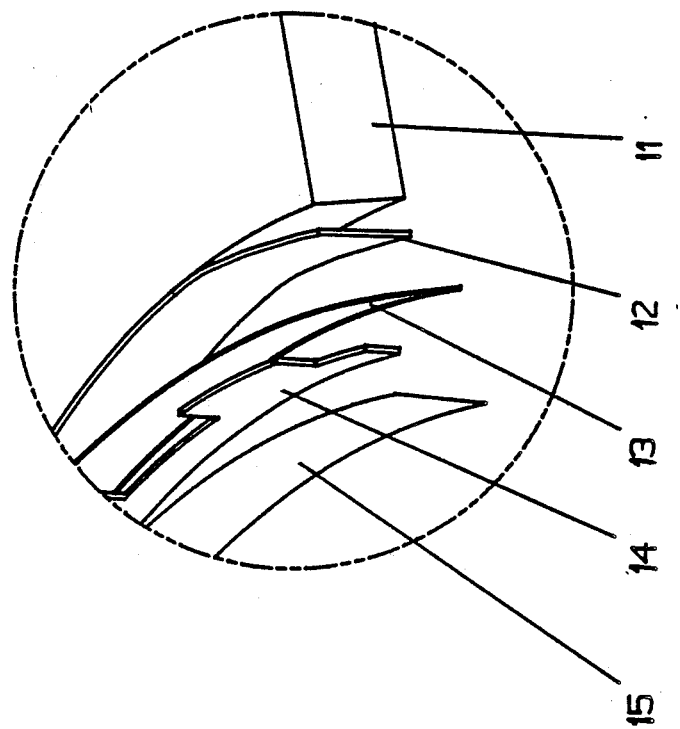
FIG. 7 is an enlarged view of portion of the construction shown in FIG. 6.
Figure 6:
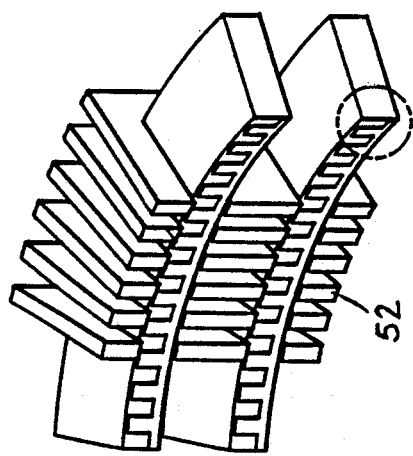
FIG. 6 is a perspective view of part of the construction of the machine of FIGS. 4 and 5.

FIGS. 6 and 7 show structures for providing commutation signals, comprising mounted on the composite bonded coil 11 a reference foil 12, isolating tape 13, capacitance foil 14 of toothed shape phase shifted relative to the machine teeth 52 and isolator/bonding tape 15.

It is important to appreciate the advantage of this arrangement that the magnetisation of the magnetic material is not reversed in direction but merely oscillates between zero or a lower value and the maximum magnetisation value. This much reduces the hysteresis loss associated with conventional electric machines. Thus in effect the magnetisation is achieved by means of pulsed direct current or DC rather than alternating current or AC.

FIG. 5 shows how the inter-tooth width is greater than the tooth width, a feature made possible by the use of the four phases. In general the ratio of tooth pitch divided by tooth width can be increased as the number of phases is increased. FIG. 4 shows an arrangement in which four phases are attained but it ill be appreciated that further phases can be incorporated, for example, by extending the stator and rotor along the shaft 61 of the machine. It will also be appreciated that a limited amount of flux leakage from one phase to the other does occur but theoretical considerations indicate and practical tests have confirmed that this is not a problem and interference is limited to second order levels of magnitude.

It has been mentioned that an optimum ratio of tooth widths to air gap may approach 5 but in practical configurations if there are limits to dimensional tolerances attainable this ratio may be optimised at a higher figure, even for example up to say 15.

I claim:

1. An electric machine having a multiple phase arrangement, a spool winding to provide an electrical excitation in each phase, in each phase the magnetic circuit including a thin rotor or moving part having toothed formations and electric current switching means to provide synchronized control of current in each winding, in which the machine stator comprises a plurality of discrete closed magnetic circuits for each phase, each magnetic circuit presenting toothed formations of corresponding pitch to the pitch of the toothed formations of the thin rotor or moving parts, in which the magnetic circuits are made up of assembled laminations which lie in planes parallel to the axis of rotation of a rotational machine.

2. An electric machine having a multiple phase arrangement, a spool winding to provide an electrical excitation in each phase, in each phase the magnetic circuit including a thin rotor or moving part having toothed formations and electric current switching means to provide synchronized control of current in each winding, wherein the machine stator comprises a plurality of discrete closed magnetic circuits for each phase, each magnetic circuit presenting toothed formations of corresponding pitch to the pitch of a toothed formations of the thin rotor or moving parts, and wherein the moving member is no more than ten air gap lengths in dimension at right angles to the direction of motion and in the general direction of flux lines.

3. An electric machine as claimed claim 3, in which the tooth widths are approximately five times the air gap dimension.

4. An electric machine having a plurality of phases, each phase having a thin rotor having toothed formations, the rotor of each phase mounted on a single, common axle, the stator of each phase including a single circular electrical winding lying in planes which are orthogonal to the axis of rotation of the axle, a plurality of magnetic paths being wrapped around each winding and corresponding to the toothed formations of the corresponding rotor, the magnetic paths lying in planes parallel with the axis of rotation of the axle, the machine having electric current switching means adapted to provide synchronized control of current in each winding.

* * * * *